United States Patent [19]

Largman

[11] 4,356,282

[45] Oct. 26, 1982

[54] PHOSPHINE SUPPRESSANTS FOR POLYMERIC COMPOSITIONS INCLUDING RED PHOSPHORUS AS A FLAME RETARDANT

[75] Inventor: Theodore Largman, Morristown, N.J.

[73] Assignee: Allied Corporation, Morris Township, Morris County, N.J.

[21] Appl. No.: 280,565

[22] Filed: Jul. 6, 1981

[51] Int. Cl.³ .................. C08K 5/09; C08K 3/16; C08K 3/02
[52] U.S. Cl. .................. 524/398; 523/451; 523/506; 524/413; 524/80; 423/322
[58] Field of Search .......... 260/45.7 PE, 45.75; 423/322; 524/80, 398, 413; 523/506, 451

[56] References Cited

U.S. PATENT DOCUMENTS

| | | | |
|---|---|---|---|
| 3,806,488 | 4/1974 | Stone et al. | 260/45.7 PE |
| 3,883,475 | 5/1975 | Racky et al. | 260/45.7 PE |
| 4,188,313 | 2/1980 | Cerny et al. | 260/45.7 PE |
| 4,210,630 | 7/1980 | Dany et al. | 423/322 |

FOREIGN PATENT DOCUMENTS

| | | | |
|---|---|---|---|
| 55-10462 | 1/1980 | Japan | 423/322 |
| 55-10463 | 1/1980 | Japan | 423/322 |

OTHER PUBLICATIONS

Chemical Abstracts–vol. 92 (1980), 164783h.
Chemical Abstracts–vol. 91 (1979), 75843q.

*Primary Examiner*—V. P. Hoke
*Attorney, Agent, or Firm*—Alan M. Doernberg; Richard C. Stewart, II; Gerhard H. Fuchs

[57] ABSTRACT

This invention relates to fire retarded polymeric composition comprising a polymeric material, red phosphorus and a phosphine suppressant which is a copper salt.

7 Claims, No Drawings

PHOSPHINE SUPPRESSANTS FOR POLYMERIC COMPOSITIONS INCLUDING RED PHOSPHORUS AS A FLAME RETARDANT

DESCRIPTION

BACKGROUND OF THE INVENTION

1. Field of the Invention

This invention relates to polymer compositions which include red phosphorus as a flame retardant agent having reduced phosphine evolution. In another aspect, this invention relates to novel phosphine suppressants, and to their use as phosphine suppressants in polymeric compositions which include red phosphorus as a flame retardant.

2. Description of the Prior Art

A variety of additives are available for flame-retarding polymeric materials. Recently, there has been a high degree of interest in employing red phosphorus as a flame retardant for such materials. For example, Largman and Stone, in U.S. Pat. No. 3,847,861, disclose that the incorporation of red phosphorus into filled or unfilled polyesters, as for example poly(ethylene terephthalate), provides a polymer having good physical properties and flame retardance. Similarly, Largman and co-workers in U.S. Pat. Nos. 3,806,488 and 3,882,070 disclose that polyamides, such as Nylon 6 and Nylon 66, are flame retarded by red phosphorus. Red phosphorus has also been reported in the literature as a flame retardant in other polymeric materials, as for example, polyolefins (U.S. Pat. No. 3,931,101); polyphenylene oxides (U.S. Pat. Nos. 3,663,054 and 3,974,235); polyacetates (U.S. Pat. No. 3,884,867); ABS Resins (Canadian Patent No. 846,892); polycarbonates (Japan Patent Nos. 73,85,642 and 75,113,475); poly(-chlorostyrene); polyacrylates (U.S. Pat. No. 3,125,553); vinyl polymers (U.S. Pat. No. 3,551,379); natural and synthetic elastomers (U.S. Pat. No. 3,597,385 and S. Africa Patent No. 700,200); epoxy resins (U.S. Pat. No. 3,375,135); polyurethanes (U.S. Pat. No. 3,763,057); and polyimides (German Patent No. 2,610,306).

While red phosphorus is very effective as a flame retardant for such polymeric materials, its use results in serious adverse effects, which in some cases seriously limits its usefulness. One extremely serious disadvantage associated with the use of red phosphorus as a flame retardant, is its tendency to form phosphine at elevated temperatures which usually accompany processing of polymeric materials, and natural and synthetic elastomers; and by reaction with atmospheric humidity. Furthermore, phosphine is spontaneously flammable, is highly toxic by inhalation and is a strong irritant. Human tolerance levels as designated by the U.S. Occupational Safety and Health Administration (OSHA) are 0.3 ppm in air or less, and are disclosed in U.S. Pat. No. 3,883,475 amounts of 400 ppm or more are dangerous to life. This problem is especially critical if high temperatures are employed in polymer fabricating processes, and if a polymer made flame proof by red phosphorus is maintained or shipped in closed containers since in such instances these concentration levels may be considerably exceeded.

Various methods have been reported in the literature for minimizing phosphine evolution. One such method which is described in U.S. Pat. Nos. 4,210,630 and 2,035,953, involves the precipitation of metal hydroxides upon the outer surface of red phosphorus particles. These procedures suffer from the disadvantge that useful hydroxide salts are often expensive. Adverse effects also include poor filterability of the phosphorus containing suspension, or in an unsatisfactory stability of the red phosphorus treated therewith.

Another method proposed for use involves the so-called phosphine traps disclosed in U.S. Pat. Nos. 3,883,475 and 4,187,207 in which such compounds as cupric oxide (CuO) are employed to fix or trap any phosphine produced. The use of copper oxide, the compound which provides the best results, considerably reduces the quantity of phosphine released into the atmosphere. However, copper oxide does cause certain adverse effects. For example, polyamides which are flame proofed with red phosphorus and which contain copper oxide as a phosphine suppressant exhibit a rather low arcing resistance (in terms of Standard Specification NF/C26,220), and their use in the manufacture of components which are intended for the electrical or electronic industries, is therefore, not recommended.

SUMMARY OF THE INVENTION

In accordance with this invention, there is provided an improved polymeric composition which is flame proofed with red phosphorus, and in which phosphine evolution into the atmosphere is substantially suppressed. This invention relates to an improved flame retarded polymeric composition of the type comprising one or more organic polymers, and red phosphorus as a flame retardant wherein said improvement comprises an effective amount of a phosphine suppressant selected from the group consisting of cuprous chloride (CuCl), cupric chloride ($CuCl_2$), cupric acetate ($Cu(CH_3COO)_2$), cuprous acetate ($CuCH_3COO$), copper metal, and complexes of cupric cations or cuprous cations and ligands containing one or more nitrogen atoms, and mixtures thereof.

The compositions of this invention are extremely fire retardant because of the red phosphorus component. Furthermore, through use of the phosphine suppressant component, the extremely effective red phosphorus fire retardant can be used in safety because of the suppression of the undesirable highly toxic phosphine.

DETAILED DESCRIPTION OF THE INVENTION

As an essential component, the improved composition of this invention includes an "effective amount" of a phosphine suppressant. As used herein, an "effective amount", is an amount of the phosphine suppressant which is sufficient to suppress the evolution of phosphine into the open atmosphere to the extent desired. In the preferred embodiments of this invention, the quantity of suppressant is such that liberation of phosphine during heat processing of the polymeric composition is substantially retarded. In the particularly preferred embodiments of this invention, the quantity of suppressant is such that the amount of phosphine evolved into the open atmosphere during heat processing of the polymeric composition is equal to or less than 0.3 parts-per-million.

As described herein, the amount of phosphine evolved is measured by conventional phosphine measuring means, as for example a DRAGER ® CH 31101 tube, manufactured by DRAGERWORK AG LUBECK, in which phosphine concentration level indications are based on the reduction of complex gold salt to colloidal gold. In this tube, a prelayer is placed in front of the indicating layer and retains all interfering substances.

As will be apparent from the disclosure hereof, the quantity of the suppressant which is necessary to constrain phosphine evolution within the above described concentration will vary with the particular suppressant and polymeric component employed, and the quantity of metal salt phosphine suppressant contained in the improved composition of this invention. The actual quantity of phosphine suppressant employed in any particular situation, is dependent on the decrease in phosphine evolution desired. Essentially, sufficient suppressant should be added so that phosphine evolution in the improved compositions of this invention is less than that for a composition which includes the polymer and red phosphorus without a phosphine suppressant. Normally, the greater the amount of the phosphine suppressant, the greater the decrease in phosphine evolution, and, conversely, the less the amount of phosphine suppressant the less the decrease in phosphine evolution. In the preferred embodiments of this invention including the preferred suppressant and preferred polymeric component, the quantity of phosphine suppressant is at least about 0.05 weight percent based on the total weight of the polymer component. In the particularly preferred embodiments, the quantity of suppressant is in the range of from about 0.1 to about 20 weight percent on the same basis, and amongst these embodiments, the most preferred will include from about 0.2 to about 5 to 10 weight percent on the same basis.

The phosphine suppressants suitable for use in the conduct of this invention are selected from the group consisting of cuprous chloride, cupric chloride, cupric acetate, cuprous acetate, copper metal, complexes of cupric cation or cuprous cation and ligands containing one or more nitrogen atoms. The cuprous and cupric inorganic salts mentioned hereinabove are well known compounds whose physical properties are well known in the literature. For example, the physical properties of cupric chloride, one of the aforementioned inorganic salts are set forth in the Handbook of Chemistry, 11th Ed, Editor John A. Dean (1973) as follows: a brown yellow powder that is hygroscopic having a density of $3.3869/cm^3$ and a melting point of 620° C.

Useful complexes of cupric and cuprous cations and a nitrogen atom containing ligands are also well known. The nitrogen atom can be in any form which allows coordination covalent bonding with cupric and/or cuprous cations. For example, such nitrogen atom can be in the form of an amide, amine, aromatic nitrogen base and the like. Such useful complexes include those formed by cupric and cuprous cations and monodentate ligands such as ammonia, mono-, di-, and tri- alkyl amines, pyridine, caprolactam, pyrrolidine, isocyanides, cyanides and the like. Useful and preferred complexes also include those formed by cupric and cuprous cations and polydentate ligands, as for example, ethylene diamine, nitrilotriacetic acid ethylene diamine triacetic acid, 2,2'dipyridyl and similar amines, phthalocyanine, 8-hydroxyquinoline and the like.

Of the aforementioned phosphine suppressants, cupric acetate, cupric chloride, cuprous chloride and complexes of cupric cation and cuprous cation and polydentate ligands are those for use in the preferred embodiments of this invention. Amongst these preferred suppressants, cupric chloride, cupric acetate and cuprous chloride are particularly preferred, with cuprous chloride being most preferred because of its high degree of effectiveness at low concentration levels which results in a lowering of the adverse effect on the rate o oxidation of red phosphorus normally caused by copper. As will be shown hereinbelow, cuprous chloride is especially useful for polyester based compositions and cupric acetate is especially useful for polyamide based compositions.

The phosphine suppressants for use in the conduct of this invention are available as crystals, pellet sticks, powders and the like from commercial sources, as for example, J. T. Baker Chemical Co., Millmaster Chemical Co., Reagents Inc., Aldrich Chemical Company, American Hoechst Corporation, Dupont and Co., Inc. and Philipps Brothers Chemical Company. Alternatively, these phosphine suppressants can be conveniently prepared in accordance with known preparative procedures, which will not be described herein in detail.

The grade of phosphine suppressant empolyed in the conduct of this invention is not critical, and reagent, practical and technical grades can be used effectively. Thus, the phosphine suppressant component need not be absoultely pure, and can have up to 10 weight percent of inert impurities based on the total weight of the phosphine suppressant without adversely affecting the physical and chemical properties of the polymeric composition.

The composition of this invention will incude "red phosphorus" as a flame retarding agent. As used herein "red phosphorus" refers to various colored allotropic varieties of phosphorus (namely, red, violet or black phosphorus). Procedures and methods of using red phosphorus as a flame retardant for polymeric materials are well known in the art and will not be described herein in detail. Such methods and procedures are set forth in detail in Kuryla, W. C., and Papa, A. J., "Flame Retardancy of Polymeric Materials," pp. 113–176 Vol. 5 Marcel Pepper Inc. (1978), and references cited therein.

The composition of this invention will also include one or more polymeric materials. A wide variety of polymeric materials may be used in the composition of this invention. Generally, any polymeric material which can be flame proofed by red phosphorus can be used. Such polymeric materials are described in detail in the above-cited prior art, and will not be described herein in any great depth.

In summary, useful polymeric materials include thermoplastic polymers, thermosetting polymers and elastomeric polymers. Illustrative of useful thermoplastic polymers are polyolefins, such as high or low density polyethylenes, polypropylenes, polyfluoroethylenes, ethylene-propylene copolymers and the like; polyvinyl chloride and copolymers, vinyl chloride, polyvinyl acetate, and the like; polysulfones; polystyrenes and acrylontrile-butadiene-styrene copolymers and the like; polyamides, such as poly(hexamethylene adipamide), polycaprolactams, poly(hexamethylene sebacamide), poly(undecanamide), poly(lauryllactam), poly(hexamethylene azelamide), and the like; saturated polyesters, such as poly(ethylene terephthalate), poly(butylene terephthalate), and the like; polycarbonates; polyacetals; cellulose esters; and polyurethanes or polyamideimides. Exemplary of useful thermosetting polymers suitable for use in this invention are phenolic resins; aminoplastic; unsaturated polyesters; polyepoxides, and polyimides; and illustrative of useful elastomers are natural or synthetic rubbers, silicone rubbers, polyurethane elastomers and the like.

Polyester compositions and polyamide compositions are preferred for use as the polymeric component of the composition of this invention. The polyester of choice is the condensation product of a benzene based aromatic dicarboxylic acid having from about 8 to about 14 carbon atoms, such as terephthalic acid, isophthalic acid and the like, and a cycloaliphatic diol such as 1,4-cyclohexane dimethyl glycol, 1,4-cyclohexanediol, and the like, and, especially an aliphatic diol having from about 2 to about 5 carbon atoms, such as ethylene glycol, 1,4-butanediol, propylene glycol and the like. Illustrative of such useful and particularly preferred polyesters are poly(ethylene terephthalate), poly(1,4-cyclohexane dimethyl) terephthalate and poly(butylene terephthalate). Among these polyesters of choice, polyethylene terephthalate is most preferred. The poly(ethylene terephthalate) and other particularly preferred polyesters can contain minor amounts, up to 5%, of other comonomers such as diethylene glycol; 1,4-butanediol; 1,4-cyclohexane dimethyl diol; glutaric acid; and the like.

The polyamide of choice is obtained by polycondensation of diacids and diamines, or by the polymerization of lactams. Amongst the polyamides of choice, poly(hexamethylene adipamide) and poly(caprolactam) are particularly preferred.

In addition to the above-described essential components, the composition of this invention can include various optional compounds which are additives commonly employed with polymer composition. Such optional components include fillers, plasticizers, impact modifiers, chain extenders, colorants, mold release agents, antioxidants, ultra violet light stabilizers, lubricants, antistatic agents, additional fire retardants and/or synergists therefor and the like. These optional components are well known to those of skill in the art, accordingly, only the preferred optional components will be described herein in detail.

The composition of this invention preferably includes a particulate filler, which function to increase the modulus and stiffness of the composition, a provides a more economical composition. Any conventional filler can be employed provided that it provide all or a portion of the above-identified functions, an does not otherwise have a deleterious effect on the composition. The fillers may optionally be treated wi various coupling agents or adhesion promoters as is known to those skilled in the art. Useful fillers may be selected from a wide variety of minerals, metals, metal oxides, siliceous materials, metal salts, and materials thereof. Examples of such useful fillers include alumina, aluminum hydrates, feldspar, asbestos talc, calcium carbonates, clay, carbon black, glass quartz, novaculite and other forms of silica, kaolinit bentonite, garnet, mica, saponite, beidellite, calcium oxide, calcium hydroxide, etc. such fillers are well known materials and are readily available. The foregoing recited fillers are illustrative only and are no meant to limit the scope of the fillers that can be employed in this invention. In the preferred embodiments of this invention fibrous materials are the fillers of choice, and glass fibers is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polyester component, and in the particularly preferred embodiment is in the range of from about 30 to about 90 weight percent on the same basis.

It is also very desirable to include a plasticizer in the composition of this invention, and such will be included in the particularly preferred embodiments in which the polymer is a polyester. The plasticizer allows crystallization of amorphous areas of the polyester to continue at lower temperatures than if a plasticizer is not used. This is particularly important in low temperature molding where the mold temperature is below the temperature at which crystallization is expected to stop. For pure polyethylene terephthalate the polyester of choice in the particularly preferred embodiments of this invention, this temperature is about 125° C. (257° F.).

The plasticizers which can be used with the composition of the present invention are of the type known in the art which can be used with linear saturated polyester molding compositions. A nonlimiting group of plasticizers which can be used are found in Dutch Patents NL 79-01605 and NL 79-01609. The plasticizer disclosed are organic esters. The organic esters can be the product of an aromatic carboxylic acid of 7–11 carbon atoms containing at least one carboxyl group per aromatic nucleus, and an alcohol selected from those of the formula (HOCH$_2$) R'$_x$ wherein x is 1, 2 or 3 and R' is a hydrocarbon radical of 2–15 carbon atoms (preferably 2–10 carbon atoms) or those of the formula HO(R"O)$_y$R'" wherein y is a cardinal number between 1 and 8, R" is a hydrocarbon radical of 2–15 carbon atoms (preferably 2–8 carbon atoms) and R'" is —H or a hydrocarbon radical of 2–20 carbon atoms (preferably 2–12 carbon atoms). The plasticizer disclosed can also be the product of an aliphatic carboxylic acid of 1 to 20 carbon atoms containing 1–3 carboxyl groups, and an alcohol of the formula HO(R"O)R'", wherein R", R'" and y are defined above. Further the plasticizer disclosed include the following: organic ketones of the formula RCR; organic sulfones R$_2$SO; organic nitriles of the formula RCN; and organic amides of the formula

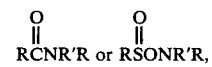

wherein R is a hydrocarbyl group of 1–25 carbons, and R' is a hydrogen or hydrocarbyl group of 1–25 carbon atoms. A preferred aliphatic plasticizer is dioctyl adipate, and a preferred aromatic plasticizer is neopentyl glycol dibenzoate. Other aromatic plasticizers which can be used include: triethylene glycol dibenzoate, glyceryl tribenzoate, trimethylolethane tribenzoate, and pentaerythretol tetrabenzoate.

The quantity of plasticizer employed can be varied widely. In the present invention up to about 15 weight percent by weight of the polyester of plasticizer can be used. Preferably, there is between about 2% and 10% based on the weight of the polyethylene terephthalate of plasticizer, and most preferably there is between about 2% and about 6% based on the weight of the polyethylene terephthalate of plasticizer.

The molding composition of this invention will preferably include an impact modifier. The type of modifier employed is not critical and can be varied widely as described. Preferably, ionic co-polymers of an α,β-unsaturated olefin such as ethylene, propylene and the like, and an α,β-unsaturated carboxylic acid such as acrylic acid, methacrylic acid and the like, and in which all or a portion of the pendant carboxyl groups have been neutralized with univalent to trivalent metal cations are employed as impact modifiers when the polymeric component is a polyester. Included within the scope of the aforementioned generic description are such ionic copolymers or ethylene/acrylic acid/Na$^{30}$, ionic copolymer; ethylene/methacrylic acid/Na+ ionic copolymers, and the like. A particularly preferred impact modifier, is an ionic copolymer of ethylene/methacrylic acid/Na+, which is marketed by Dupont Corporation of Wilmington Del. under the trademark Surlyn ®. The composition will include up to about 10 weight percent, and preferably from about 2 to about 6 weight percent of the impact modifier based on the total weight of the polyester.

The polyester based compositions of this invention may also include a polyepoxide which functions as a chain extender and helps to compensate for polyester chains which are broken by hydrolysis. Illustrative of epoxy resins which can be used include as an epoxy formed from bisphenol-A and glycidyl ether, or polyepoxides obtained by reacting orhocresol novalac and epichlorohydrin. Preferred polyepoxides are epoxy cresol novalac resins which are commercially available under the trade designation ECN 1245, 1273 and 1299 from Ciba-Geigy Corporation. Preferably, there is up to about 3 percent and more preferably 0.1% to about 0.5% weight percent of polyepoxide based on the total weight of the polyester component.

The polymeric composition of this invention can be further modified by the addition of one or more pigments. Illustrative of useful pigments are iron oxide, cadmium red, rhodamine, chrome yellow and chrome green.

The phosphine suppressants for use in this invention may include other optional metal cations in addition to the required copper cations, to function as other polymer additives, such as nucleating agents when the polymeric component is a polyester. Such additional optional cations include sodium cations (Na+).

The polymer composition of this invention can be prepared by blending the essential components, and other optional components as desired, employing any convenient blending means. Appropriate blending means as for example melt extrusion or batch mixing are well known in the art and will not be described herein in great detail. In the preferred embodiments of the invention the phosphine suppressant is carefully dried prior to mixing of formulation. Blending temperatures and pressures, and order of addition of the various components are not critical provided that a homogenous composition results. The blending procedure can be carried out at elevated temperatures, in which case the meltable solid components are melted and the components are mixed by vigorously stirring the melt. Similarly, the various solid components can be granulated, and the granulated components mixed dry in a suitable blender, as for example a Branbury mixer, as uniformly as possible. The meltable components are then melted in an extruder and expressed with cooling.

The compositions of this invention are extremely fire retardant because of the red phosphorus component. Furthermore, these compositions are characterized by reduced evolution of phosphine during heat processing. The compositions according to the invention can be partially crystalline to amorphous, depending on which individual constituents are employed. They are thermoplastic materials from which molded articles of manufacture having valuable properties can be produced by the conventional shaping processes, such as casting, injection molding and extruding. Examples of such moldings are components for technical equipment, apparatus castings, household equipment, sports equipment, components for the electrical and electronics industries and electrical insulations, car components, circuits, fibers and semi-finished products which can be shaped by machining. The use of the materials for coating articles by means of immersion or powder coating processes is also possible, as is their use as hot-melt adhesives. The moulding compositions according to the invention are outstandingly suitable for specific applications of all types since their spectrum of properties can be modified in the desired direction in manifold ways.

The compositions according to the invention are outstandingly suitable for the production of sheets and panels having valuable properties. The sheets and panels according to the inventions are suitable as coating materials for other materials comprising, for example, wood, glass, ceramic, metal or other plastics, and outstanding strengths can be achieved using conventional adhesion promoters, for example based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, for example by lacquering or by the application of protective films.

The following specific examples are presented to more particularly illustrate the invention, and should not be construed as being limitations on the scope and spirit of the invention.

EXAMPLE I

The compositions of Example I were prepared by charging pellets of the polymeric component and the desired amount of the red phosphorus and phosphine suppressant components into a BUCHI/BRINKMAN water bath evaporator manufactured by Brinkman Corporation. In these examples, the polymeric component is either Nylon 6 (polycaprolactam) which has a viscosity of 1.9 and which is commercially available from Allied Corporation under the trade designation CAPRON ® grade SP108; Nylon 66, which has a viscosity of 1.7 and which is commercially available from E. I. DuPont De Nemours and Co., Inc. under the trade designation ZYTEL ® 101; or poly(ethylene terephthalate) (PET) which has an intrinsic viscosity of 0.54 and which is commercially available from DuPont Corporation under the trade designation RYNITE ™. The red phosphorus was obtained from American Hoechst Corporation and the phosphine suppressants i.e. Cu(acetate)$_2$, CuCl$_2$, Cu(metal) and CuCl, were obtained from Aldrich Chemical Company. cations with ethylene diamine tetraacetic acid, and phthalocyanine were obtained from E. I. DuPont De Nemours and Co., Inc.

After thorough mixing, the mixture was charged into an extruder manufactured by Wayne Corporation and extruded at elevated temperatures as a mono-filament. Extrusion temperature for the PET, Nylon 6 and Nylon 66 based compositions were 275° C., 255° C. and 295° C., respectively. The mono-filaments were dried overnight at 110° C., after which the dried mono-filaments are pelletized. The pellets are stored for 18 hrs. in a sealed vessel. During this procedure measurements are made to determine the concentration of phosphine evolved at the extruder die, at the pelletizer and after storage of the pellets in a sealed vessel for 18 hrs. The measurements were taken with a DRAGER CH 31101 tube in the manner described hereinabove.

The percent composition of the test composition, and the concentration of phosphine in parts-per-milion (ppm) evolved are set forth in the following Tables I to III.

TABLE I
PHOSPHINE EVOLUTION IN NYLON 6 BASED COMPOSITIONS

| % Red P[e] | % PH$_3$ Suppressant | % DARCO[a] 6-60 | PH$_3$ at Pelletizer | PH$_3$ in sealed Vessel |
|---|---|---|---|---|
| 4 | 1.0 CuEDTA[b] | 0 | — | 0 ppm |
| 4 | 1.0 Cu(AC)$_2$[c] | 0 | 0 ppm | 0 ppm |
| 4 | 1.0 CuCap[f] | 0 | 1 ppm | 0 ppm |
| 4 | 1.0 CuCl$_2$ | 0 | 0 ppm | 0 ppm |
| 4 | 1.0 Cu | 0 | 1 ppm | 1.8 ppm |
| 4 | 0.5 CuCl | 0 | 0.1 ppm | 0 ppm |
| 4 | 0.5 CuCl | 0.7 | 0 ppm | 0 ppm |
| 4 | 0.5 CuCl$_2$ | 0 | 0.1 ppm | 0 ppm |
| 4 | 0.5 CuCl$_2$ | 0.7 | 0.7 ppm | 1.0 ppm |
| 4 | 0.4 Cu(AC)$_2$ | 0 | 0 ppm | 0.4 ppm |
| 4 | 0.4 Cu(AC)$_2$ | 0.7 | 0 ppm | 0 ppm |
| 4 | 0.5 Cu | 0.7 | 0 ppm | |
| 4 | — | 0.7 | 0.5 ppm | 0.2 ppm |
| 4 | 0.5 CuCl$_2$ | 0 | 2.0 ppm | 9 ppm |
| 4 | 0.5 CuCl$_2$ | 0.7 | 0.1 ppm | 5 ppm |
| 4 | 0.4 CuCl$_2$ | 0 | 0.6 ppm | 6 ppm |
| 4 | 0.4 CuCl$_2$ | 0.7 | 0.2 ppm | 4.5 ppm |
| 4 | 0.3 Cu(AC)$_2$ | 0 | 0 ppm | 35 ppm |
| 4 | 0.3 Cu(AC)$_2$ | 0.7 | 1.0 ppm | 10 ppm |
| 4 | 0.3 CuCl | 0 | 0 ppm | 7 ppm |
| 4 | 0.3 CuCl | 0.7 | 0 ppm | 1.8 ppm |
| 4 | 0.5 Cu | 0 | 6.0 ppm | <20 ppm |
| 4 | 0.5 CuCl | 0 | 0 ppm | 0.3 ppm |
| 4 Exo[d] | | | 0 ppm | 0 ppm |
| 4 Exo[d] | 0.5 CuCl | 0.7 | | |
| 4 | 1.5 Cu Phthalocyanine | — | 1.5 ppm | 8 ppm |

In TABLE I and hereinafter, the following symbols are used.
[a]"Darco 6-60" is an activated charcoal manufactured by MCB Manufacturing Chemists.
[b]"EDTA" is ethylene diamine tetraacetic acid.
[c]"AC" is acetate anion.
[d]"Exo" is Exolite a 92% Red Phosphorus manufactured by American Hoechst Corporation.
[e]"P" is Phosphorus.
[f]"Cap" is caprolactam.

TABLE II
PHOSPHINE EVOLUTION IN NYLON 66 BASED COMPOSITIONS

| % Red P | % PH$_3$ Suppressant | % DARCO C | PH$_3$ at Pelletizer | PH$_3$ in Bag |
|---|---|---|---|---|
| 4 | 0.5 CuCl | 0 | 0 ppm | 0 ppm |
| 4 | 0.5 CuCl | 0 | 0 ppm | 0 ppm |

TABLE III
PHOSPHINE EVOLUTION IN PET BASED COMPOSITIONS

| % Red P | % PH$_3$ Suppressant | % DARCO$_1$ C | PH$_3$ at Pelletizer | PH$_3$ in Bag |
|---|---|---|---|---|
| 4 | 1.0 CuCl$_2$ | 0 | — | 0 ppm |
| 4 | 1.0 Cu | 0.5 | 0.1 ppm | 0.2 ppm |
| 4 | 0.4 Cu(ac) | 0 | 0 ppm | 0 ppm |
| 4 | 0.4 Cu(ac) | 0.7 | 0 ppm | 0 ppm |
| 4 | 0.5 Cu | 0 | 0 ppm | 0.2 ppm |
| 4 | 0.5 Cu | 0.7 | 0.2 ppm | 5 ppm |
| 4 | 0.5 CuCl | 0 | 0 ppm | 0 ppm |
| 4 | 0.5 CuCl | 0.7 | 0.1 ppm | 0 ppm |
| 4 | — | 0.7 | 0 ppm | 1.2 ppm |
| 4 | 0.5 CuCl$_2$ | 0 | N.R. | 0 ppm |
| 4 | 0.5 CuCl$_2$ | 0.7 | 0 ppm | 0 ppm |
| 4 | 0.3 Cu(AC)$_2$ | 0 | 0 ppm | 0.1 ppm |
| 4 | 0.3 Cu(AC)$_2$ | 0.7 | 0 ppm | 0 ppm |
| 4 | 0.3 CuCl | 0 | 0 ppm | 0 ppm |
| 4 | 0.3 CuCl | 0.7 | 0 ppm | 0 ppm |
| 4 | 0.4 Cu | 0 | 0 ppm | 0 ppm |
| 4 | 0.4 Cu | 0.7 | 0 ppm | 1 ppm |
| 4* | 0.5 CuCl | 0 | 0 ppm | 0 ppm |
| 4* | 0.5 CuCl | 0.7 | 0 ppm | 0 ppm |
| 4 | 0.1 CuCl | 0 | 0.1 ppm | 6 ppm |
| 4 | 0.1 CuCl | 0 | 0.1 ppm | 0.9 ppm |
| 4 | 0.1 Cu(AC)$_2$ | 0 | 1.0 ppm | >50 ppm |
| 4 | 0.1 Cu(AC)$_2$ | 0.7 | 0 ppm | 0 ppm |

*Exolite

COMPARATIVE EXAMPLE I

Employing the procedure of Example I various Nylon 66 SP108 and PET compositions containing red phosphorus and a metal salt were prepared and phosphine evolution was determined. The results are set forth in the following Tables IV and V.

TABLE IV
PHOSPHORUS SUPPRESSION IN NYLON 6 BASED COMPOSITION CONTAINING METAL SALTS

| % Red P | PH$_3$ Additive | % DARCO C | PH$_3$ at Pelletizer | PH$_3$ in Bag |
|---|---|---|---|---|
| 4 | 1.0 SnO$_2$ | 0 | 0.8 ppm | 10 ppm |
| 4 | 1.0 ZrO | 0 | 3 ppm | 8 ppm |
| 4 | 1.0 PbO | 0 | 0.6 ppm | 0 ppm |
| 4 | 1.0 PbO$_2$ | 0 | 1 ppm | 50 ppm |
| 4 | 1.0 Pb(AC$_2$) | 0 | 0.8 ppm | 50 ppm |
| 4 | 1.0 Al(isoproproxide) | | 0 ppm | 30 ppm |
| 4 | 0.5 PbO | 0 | 5.0 ppm | <20 ppm |
| 4 | 0.5 PbO | 0.7 | 3.0 ppm | <50 ppm |
| 4 | 0.5 ZnCl$_2$ | 0 | 7.5 ppm | |
| 4 | 0.5 ZnCl$_2$ | 0.7 | 5.0 ppm | 30 ppm |
| 4 | 0.5 Zr(AC)$_2$ | 0 | 2.0 ppm | 40 ppm |
| 4 | 0.5 Zr(AC)$_2$ | 0.7 | 5.0 ppm | 40 ppm |
| 4 | 0.5 AlBr$_3$ | 0 | — | <40 ppm |
| 4 | 1.0 CuO | 0 | 0 ppm | 0.1 ppm |
| 4 | 0.5 CuO | 0 | 0 ppm | 0.2 ppm |
| 4 | 0.33 CuO | 0 | 2 ppm | 10 ppm |

TABLE V
PHOSPHINE SUPPRESSION IN PET COMPOSITIONS WITH CuO

| % Red P | % Suppressant | % DARCO C | PH$_3$ at Pelletizer | PH$_3$ in Bag |
|---|---|---|---|---|
| 4 | 1.0 CuO | 0 | — | 3 ppm |
| 4 | 1.0 CuO | .5 | — | 0.5 ppm |
| 4 | 0.7 CuO | 0.7 | 0.1 ppm | 0 ppm |
| 4 | 0.7 CuO | 0.7 | 0 ppm | 0 ppm |

As can be readily seen from the above specific examples the compositions of this invention exhibit reduced levels of phosphine evolution, as compared to compositions which include other organic and inorganic salts. Furthermore, the phosphine suppressants employed in this invention are effective at reduced concentration levels, and normally do not result in a substantial adverse affect on the characteristics of polymeric compositions, or their extrusion.

The foregoing detailed description of the invention has been given for clearness of understanding only, and no unnecessary limitations are to be understood therefrom. The invention is not limited to the exact details herein shown and described, and will encompass obvious modifications which will occur to those of skill in the art in light of the appended claims.

What is claimed is:

1. In a polymeric composition of the type comprising one or more organic thermoplastic, thermosetting, and/or elastomeric polymeric materials and red phosphorus as a flame retardant, the improvement comprising: at least about 0.05 weight percent based on the total weight of the composition to suppress phosphine evolution of a phosphine suppressant selected from the group consisting of cuprous chloride, cupric chloride, cuprous acetate, cupric acetate, copper metal and mixture thereof.

2. A composition according to claim 1 wherein said polymeric material is a linear saturated polyester or a polyamide.

3. A composition according to claim 1 wherein said phosphine suppressant is cuprous chloride, cupric chloride or cuprous acetate.

4. A composition according to claim 1 wherein said polymeric material is a polyamide, and said phosphine supressant is cupric acetate.

5. A composition according to claim 1 wherein said polymeric material is a polyester, and said phosphine suppressant is cuprous chloride.

6. A composition according to claim 1, 2, 3, 4 or 5 wherein said amount is in the range of from about 0.1 to about 20 weight percent based on the total weight of the composition.

7. A composition according to claim 6 wherein said amount is in the range of from about 0.3 to about 10 weight percent based on the total weight of the composition.

* * * * *